Figure 1:
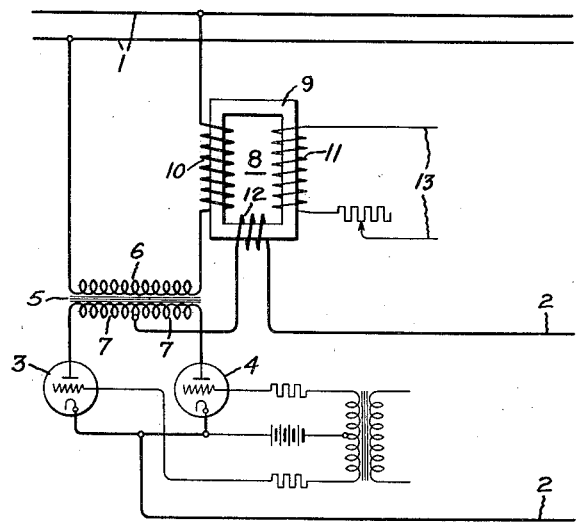

June 22, 1937.  A. SCHMIDT, JR  2,084,870

SYSTEM OF ELECTRICAL DISTRIBUTION

Filed Oct. 10, 1935

Inventor:
August Schmidt Jr.,
by Harry E. Dunham
His Attorney.

Patented June 22, 1937

2,084,870

UNITED STATES PATENT OFFICE 2,084,870

SYSTEM OF ELECTRICAL DISTRIBUTION

August Schmidt, Jr., Schenectady, N. Y., assignor to General Electric Company, a corporation of New York Application October 10, 1935, Serial No. 44,453

5 Claims. (Cl. 175—363)

My invention relates to systems of electrical distribution and more particularly to such systems including electric valves for transmitting energy between alternating and direct current circuits.

Electric valve apparatus such as mercury arc rectifiers, have come into extensive use for supplying direct current distribution systems from alternating current feeder circuits. In this type of apparatus it is important to provide systems of inherently rugged nature which will assure continuity of service. Furthermore, it is desirable to have in apparatus of this type inherent regulation characteristics to maintain a network voltage substantially constant from no load to full load and to provide a decidedly drooping voltage characteristic for loads in excess of the normal rating of the apparatus. With the use of distribution apparatus of this regulation characteristic it is possible to maintain the apparatus in service up to practically short circuit condition and to dispense with the use of expensive overload protective apparatus.

On the other hand, it is desirable in some applications to provide apparatus having inherent regulation characteristics to maintain a network voltage substantially constant from no load to full load and to provide a decidedly rising voltage characteristic for loads in excess of a predetermined maximum value. My invention may be applied to an electrical distribution system to provide such a rising voltage characteristic when the load exceeds a predetermined value.

An object of my invention is to provide a new and improved electrical distribution system.

Another object of my invention is to provide an improved system of electrical distribution for transmitting energy between an alternating current circuit and a direct current circuit and by means of which either of the above-mentioned desirable regulation characteristics may be obtained.

It is a further object of my invention to provide a new and improved system of electrical distribution including an electric valve for transmitting energy between an alternating current circuit and a direct current circuit in which a predetermined voltage characteristic of the direct current circuit may be maintained for values of load current within the normal or nominal rating of the apparatus and in which the voltage of the direct current circuit may be made to depart from the aforesaid characteristic in response to increase of load current above the nominal rating of the apparatus.

In accordance with the illustrated embodiment of my invention, a direct current circuit is energized from an alternating current circuit through one or more electric valves, preferably of the vapor electric discharge type. A variable impedance means is utilized to control the potential impressed upon the electric valves, and hence to control the voltage of the direct current circuit by means of a winding interposed between the alternating current circuit and the electric valves. This variable impedance means, shown in the form of a saturable reactor, is also provided with at least two additional windings. One of these windings is energized from a source of direct current to establish a unidirectional magnetomotive force in the reactor and the other winding, which is energized in response to the rate of energy transfer between the circuits, is utilized to control the resultant unidirectional magnetomotive force and hence the magnetization of the reactor. This arrangement makes it possible not only to maintain a predetermined electrical characteristic within a normal range of energy transfer, but it also makes it possible to control the characteristic of the apparatus upon overload.

For a better understanding of my invention, together with other and further objects thereof, reference may be had to the description taken in connection with the accompanying drawing, and its scope will be pointed out in the appended claims.

Figure 2:
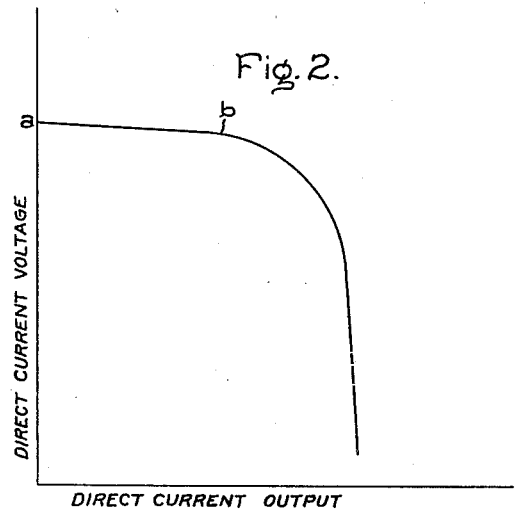

In the drawing, Fig. 1 illustrates diagrammatically an embodiment of my invention for transmitting energy from a single phase alternating current circuit to a direct current circuit, while Fig. 2 represents a regulation characteristic of the apparatus illustrated in Fig. 1.

Referring now to Fig. 1 of the drawing, there is shown an electrical distribution system embodying my invention for transmitting energy between an alternating current circuit and a direct current circuit. By way of example, I have shown my invention as applied to a distribution system for transmitting energy from a single phase alternating current circuit 1 to a direct current circuit 2, through electric valves 3 and 4, preferably of the vapor electric discharge type, a transformer 5 having a primary winding 6 and a secondary winding 7. For controlling the energy transmitted between the two circuits, I connect in series relation with the transformer winding 6 a variable impedance, which is shown in the form of a direct current biased saturable reactor 8. This variable impedance, in accordance with the broader aspects of my invention, may take any suitable form in which the impedance thereof can be controlled in a predetermined manner or at a predetermined rate for one condition of operation and which can be controlled in a different predetermined manner or at a different predetermined rate for a different condition of operation. By means of the variable impedance arrangement, an electrical quantity of substantially constant magnitude and another electrical quantity of varying magnitude are utilized to obtain a resultant quantity which may be made to vary at a predetermined rate over a predetermined range of operation and which may be made to vary at a different predetermined rate over another predetermined range of operation. The saturable reactor 8 is provided with a saturable core member 9 and a winding 10 connected in series with the alternating current source 1 and the primary winding 6 of transformer 5. The voltage impressed upon the primary winding 6 of transformer 5 will be the vectorial difference between the voltage of alternating current source 1 and the impedance voltage drop incident to the flow of current through winding 10 of reactor 8.

To provide a means for controlling the voltage impressed upon the primary winding 6 of transformer 5 and hence for controlling the voltage impressed upon the anodes of electric valves 3 and 4 in response to the current in the load circuit 2, I have shown two windings 11 and 12 to control the saturation of the core member 9 and thereby control the inductive reactance of the winding 10. Winding 11 is energized from a source of direct current 13 of substantially constant value to impress upon the magnetic circuit of core member 9 a substantially constant unidirectional magnetomotive force. Winding 12, which I have shown as being energized in response to the current in the load circuit 2, may be either differentially or cumulatively arranged relative to winding 11.

It will be understood by those skilled in the art that as the saturation of the core member 9 is increased, the impedance of winding 10 will decrease. The resultant magnetomotive force acting upon the magnetic circuit of core member 9 and hence the impedance of winding 10 may be controlled by means of winding 12.

If it is desired to obtain a voltage regulation characteristic which maintains the voltage of circuit 2 substantially constant over a certain range of power transfer and effects a decided decrease in the voltage for values of energy transfer above the predetermined range, winding 12 is arranged to oppose the magnetomotive force due to winding 11. On the other hand, if a rising voltage characteristic is desired in the event the load exceeds a predetermined value, winding 12 may be connected to assist winding 11.

While I have shown my invention as applied to a rectifying system, it will be apparent to those skilled in the art that it is equally applicable to electrical translating systems in general.

The operation of my invention as applied to the distribution system shown in Fig. 1, may be best explained by first considering the system when it is arranged to maintain a predetermined constant voltage of the direct current circuit 2 for a certain range of load, and to decrease the voltage when the load exceeds a certain value. In such an arrangement, winding 12 is differentially associated with the winding 11. To obtain this regulation characteristic the winding 11 is energized to effect substantial saturation of the core member 9 of reactor 8 within the normal range of load. The impedance of winding 10 will remain substantially constant within the normal range of load. However, as the load current of circuit 2 increases to a value above the normal range, it will be understood that the magnetization of the core member 9 will be decreased by winding 12 to effect desaturation of the reactor and an increase in the impedance of winding 10 resulting in a decrease in the voltage of direct current circuit 2.

A voltage-current characteristic incident to my invention is shown in Fig. 2, in which the curve represents the voltage characteristic of circuit 2 when the windings 11 and 12 are differentially arranged. It will be seen that under these conditions a substantially constant output voltage is maintained over the normal range of load $a$—$b$, and that as an overload is placed on the apparatus the voltage decreases abruptly according to a predetermined characteristic. The characteristic which the apparatus follows when the load exceeds the normal range is controlled by the apparatus of my invention, and the nature of this overload characteristic may be varied by the design of the reactor.

To obtain a rising voltage characteristic when the load exceeds a certain value, the winding 11 is energized to effect magnetization of the reactor 8 and to maintain the magnetization of the core member 9 along the straight portion of the saturation curve so that the impedance remains substantially constant over the normal range of load. In this instance, winding 12 is connected to assist winding 11 and to effect saturation of the reactor 8 when the load exceeds the predetermined value. As the reactor becomes saturated, the impedance of winding 10 will decrease to effect a rise in the voltage of circuit 2.

While I have shown and particularly described certain embodiments of my invention for the purpose of explaining its principle and showing its application, it will be obvious to those skilled in the art that many modifications are possible without departing from my invention in its broader aspects, and I aim in the appended claims to cover all such modifications as fall within the true spirit and scope of my invention.

What I claim as new and desire to secure by Letters Patent of the United States is:

1. In combination, a supply circuit, a load circuit, and translating means interposed between said circuits and constructed and arranged for controlling an electrical characteristic of said load circuit within a predetermined range of current supplied to said load circuit and for effecting a predetermined departure from said characteristic for values of current above said range comprising a saturable reactor including a winding having a substantially constant impedance for values of current transfer within said range and having an abruptly varying impedance for values of current above said range.

2. In combination, a supply circuit, a load circuit, translating means comprising an electric valve for interconnecting said systems, and impedance means interposed between said supply circuit and said electric valve for controlling the voltage impressed upon said electric valve, said impedance means comprising a saturable reactor constructed and arranged to maintain the inductive reactance of said impedance means substantially constant within a predetermined range of current supplied to said load circuit and arranged to vary abruptly the inductive reactance of said impedance means for values of current above said predetermined range.

3. In an electric translating circuit, a supply circuit, a load circuit, and variable impedance means constructed and arranged for supplying a substantially constant potential to said load circuit within a predetermined range of current supplied to said load circuit and for supplying a substantially constant current to said load circuit for values of current transfer above said predetermined range comprising a saturable reactor having a winding interposed between said supply circuit and said load circuit, a unidirectional magnetizing winding for establishing a substantially constant magnetomotive force and a winding associated with said unidirectional magnetizing winding and responsive to the current transfer between said supply circuit and said load circuit for controlling the magnetization of the reactor.

4. In a system of distribution, a supply circuit, a load circuit, means including an electric valve for controlling the energy transferred from said supply circuit to said load circuit, and means constructed and arranged for impressing upon said electric valve a substantially constant potential within a predetermined range of current in said load circuit and for controlling abruptly said potential in response to said load current as the current exceeds a predetermined maximum value comprising a reactor having a winding connected in series with said supply circuit and said electric valve, a undirectional magnetizing winding for establishing a substantially constant magnetomotive force and a winding differentially associated with said unidirectional magnetizing winding and energized by the current of said load circuit for controlling the saturation of said reactor.

5. In a system of distribution, an alternating current circuit, a direct current load circuit, means including an electric valve for controlling the energy transferred from said supply circuit to said load circuit, and means constructed and arranged for maintaining a substantially constant voltage on said load circuit within a predetermined range of load current and for providing an abruptly drooping volt-ampere characteristic above said range of load current comprising a saturable reactor having a winding in series with said alternating current circuit and said electric valve for controlling the potential impressed upon said valve, a direct current saturating winding arranged to establish a substantially constant magnetomotive force for effecting substantial saturation of said reactor within said predetermined range of load current and a winding energized by the current of said load circuit for effecting rapid desaturation of said reactor for values of current above said predetermined range of load current.

AUGUST SCHMIDT, JR.